Figure 1:
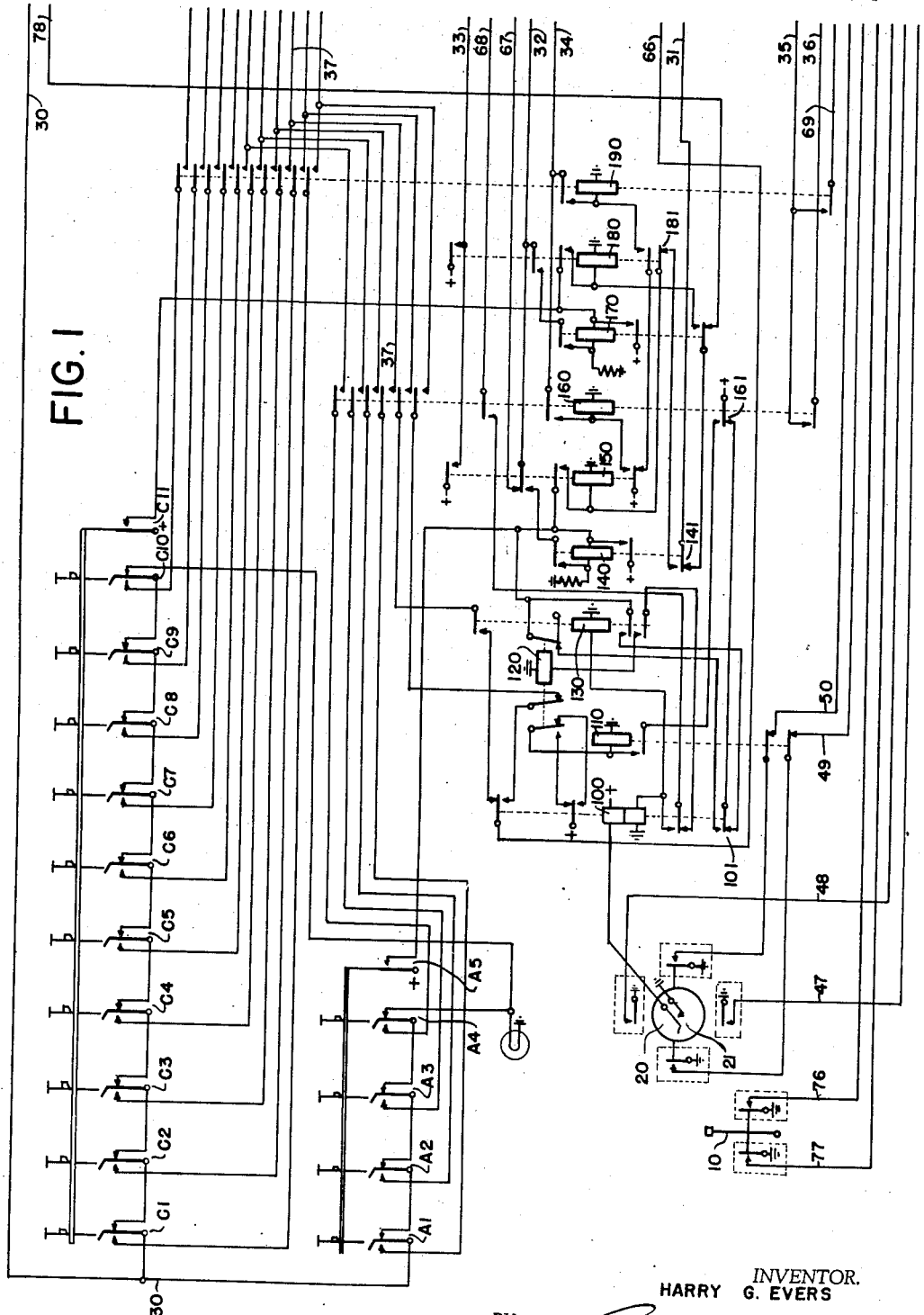

Aug. 2, 1949.　　　　H. G. EVERS　　　　2,477,973
REMOTE CONTROL SYSTEM
Filed Aug. 21, 1944　　　　6 Sheets-Sheet 3

INVENTOR.
HARRY G. EVERS
BY
ATTORNEY.

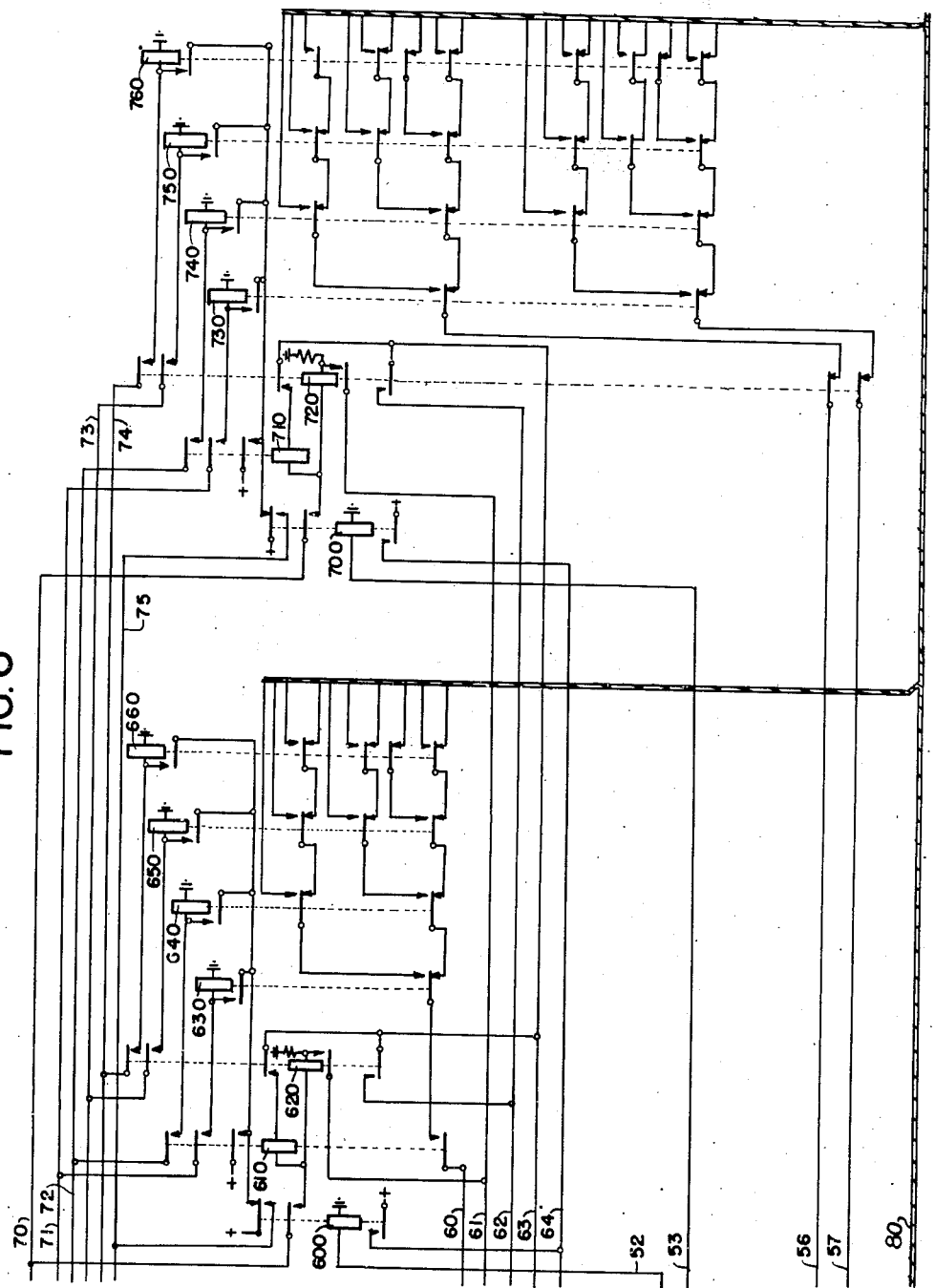

Patented Aug. 2, 1949

2,477,973

UNITED STATES PATENT OFFICE 2,477,973

REMOTE CONTROL SYSTEM

Harry G. Evers, Chicago, Ill., assignor to Automatic Electric Laboratories, Inc., Chicago, Ill., a corporation of Delaware Application August 21, 1944, Serial No. 550,362

11 Claims. (Cl. 177—353)

The present invention pertains in general to Remote Control Systems and particularly to a system which employs a plurality of signaling channels to control a multiplicity of functions at a number of remote stations either simultaneously or selectively.

The disclosure illustrating one embodiment of the invention is used to control the operation of three aircraft, selectively or simultaneously, from a fourth control aircraft by means of a radio frequency carrier upon which ten audio frequency signaling tones may be superimposed. It is to be understood that the invention is not limited to the control of aircraft as it will be apparent that it is readily adapted to the control of other moving vehicles or stationary equipment either by means of the radio link illustrated or by wire lines.

The principal object of the present invention is to provide a signaling system that is capable of controlling a multiplicity of functions at a rapid rate through the efficient use of a plurality of signaling channels but without requiring the use of more than one channel at a time.

A further object of the invention is to provide a code sender for the control station having code selecting means that is common to a plurality of groups of control keys each of which controls a separate function, to provide means for allowing preferential use of the code selecting means by certain of the groups of control keys, to provide arrangements for sending codes in sequence when the key operations overlap, and to provide a novel method of initiating the operation of the code sender in response to the operation of a control key. This object is covered by a divisional application, Serial No. 627,260 bearing the same title, filed November 7, 1947.

Another object of the invention is to provide a signal receiving system in which one incoming signal channel is associated with a common control unit and in which each one of a plurality of further incoming signaling channels is associated with one of a plurality of further control units, each of the further control units being operative in conjunction with the common unit to control a group of functions, the group selection being determined by which one of the further channels the signals are received over and the function selection being determined by the chronological relationship between impulses received over the selected one of said further signaling channels and a series of impulses received over said one channel.

A still further object of the invention is to provide a signaling system for controlling a plurality of groups of functions by means of coded impulses sent over a plurality of signaling channels as in the preceding object and in which identical codes may be employed for controlling functions in different groups.

Still another object of the invention is to provide an improved signaling system for controlling a number of corresponding functions at a plurality of remote stations either simultaneously or selectively.

A feature of the invention is the attainment of the preceding objects by means of switching equipment consisting wholly of relays.

Figure 2:
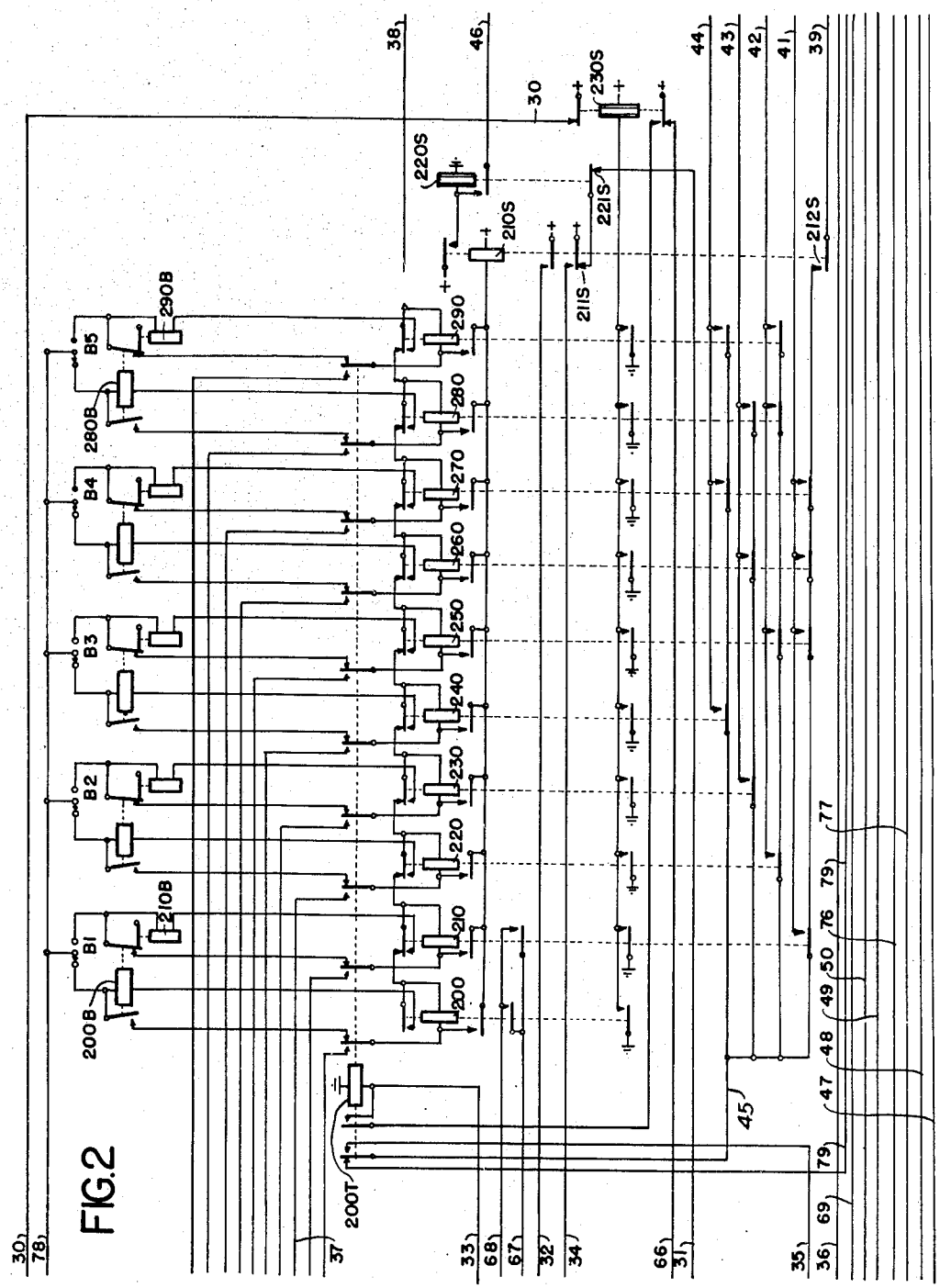
Figure 3:
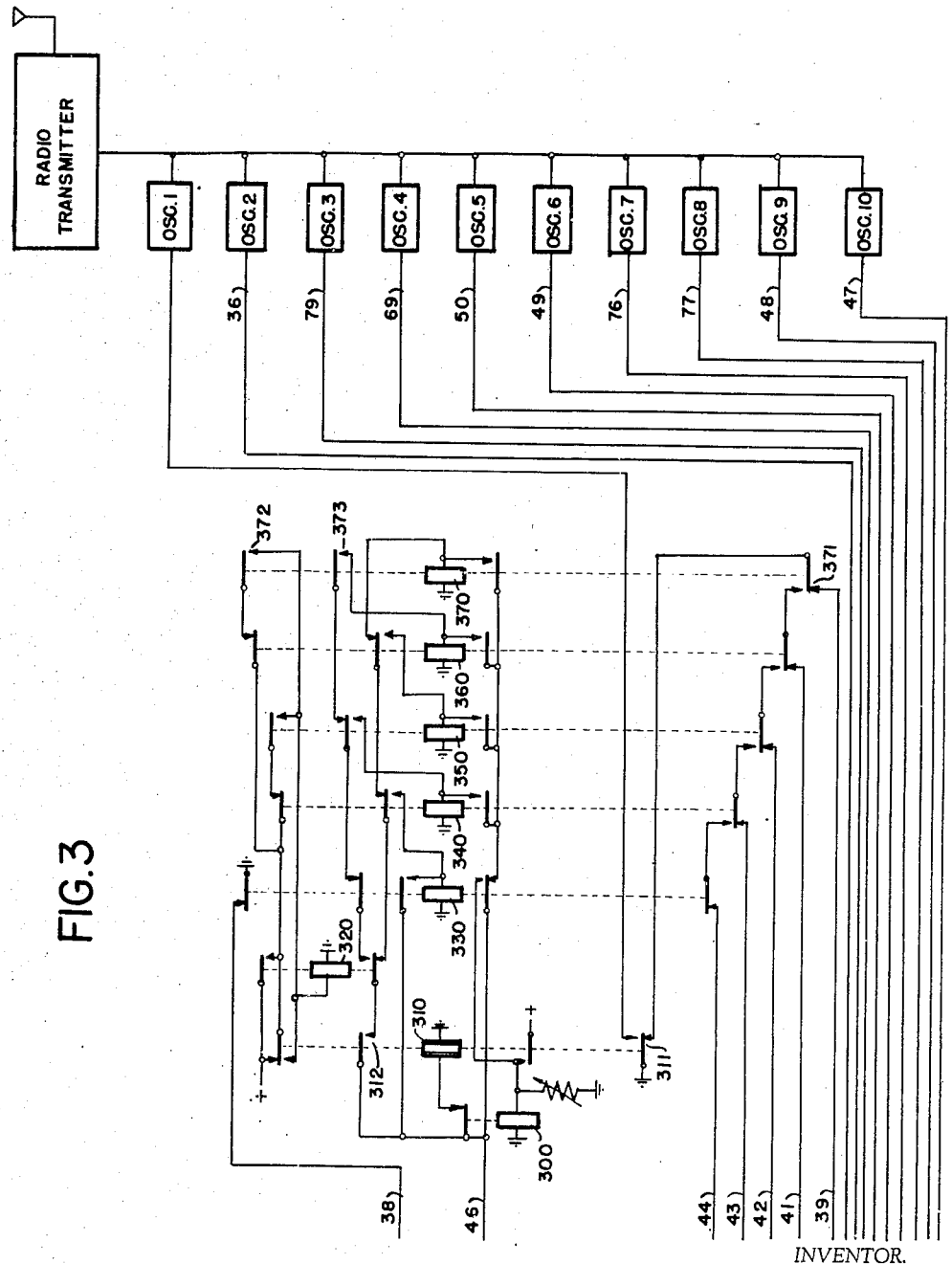

Other objects and features of the invention will become apparent upon a further perusal of the specification and the accompanying drawings, in which:

Figs. 1, 2 and 3, when placed side by side in the order named, comprise a schematic diagram of the switching equipment employed in the control plane.

Figure 4:
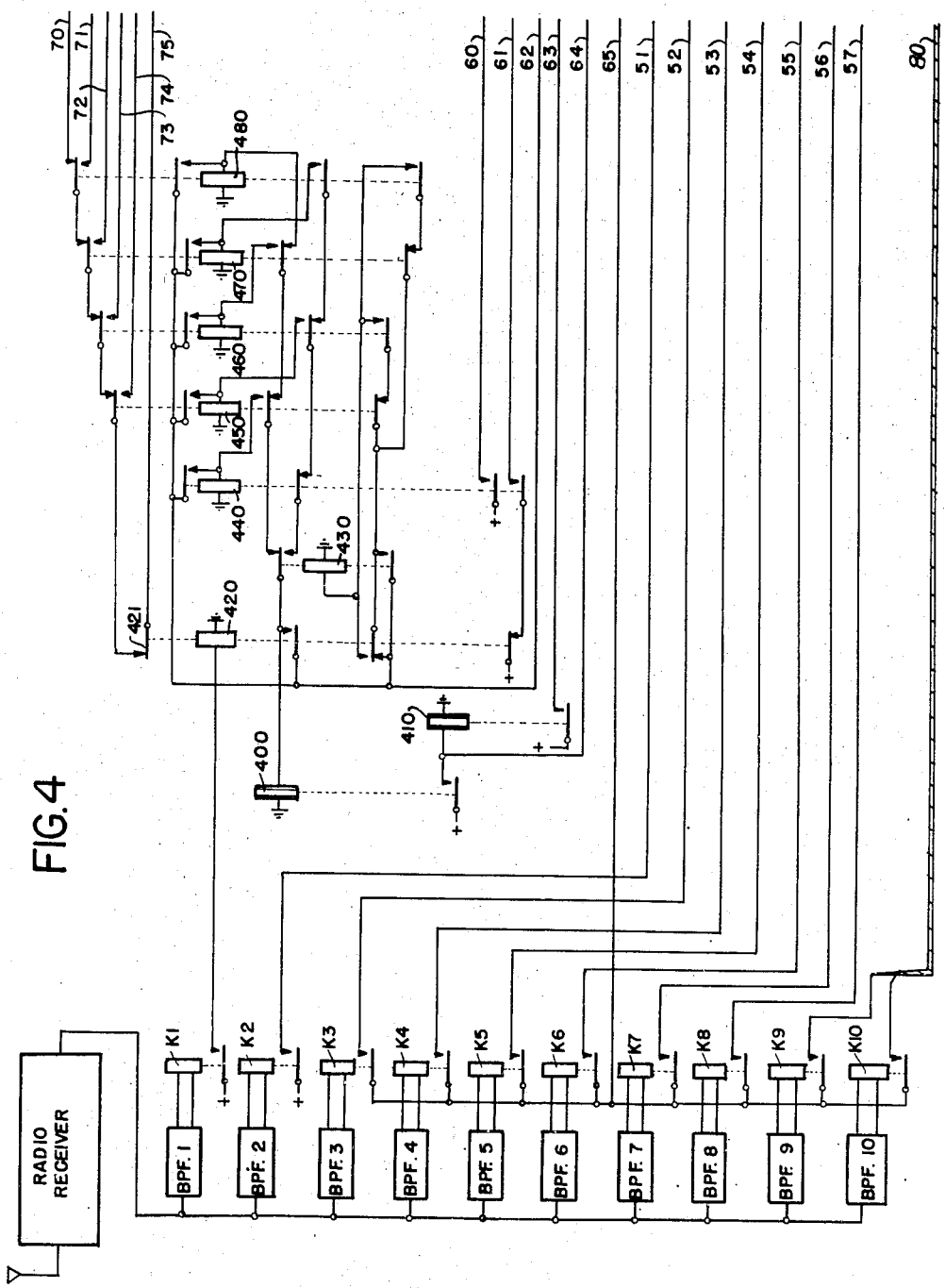
Figure 5:
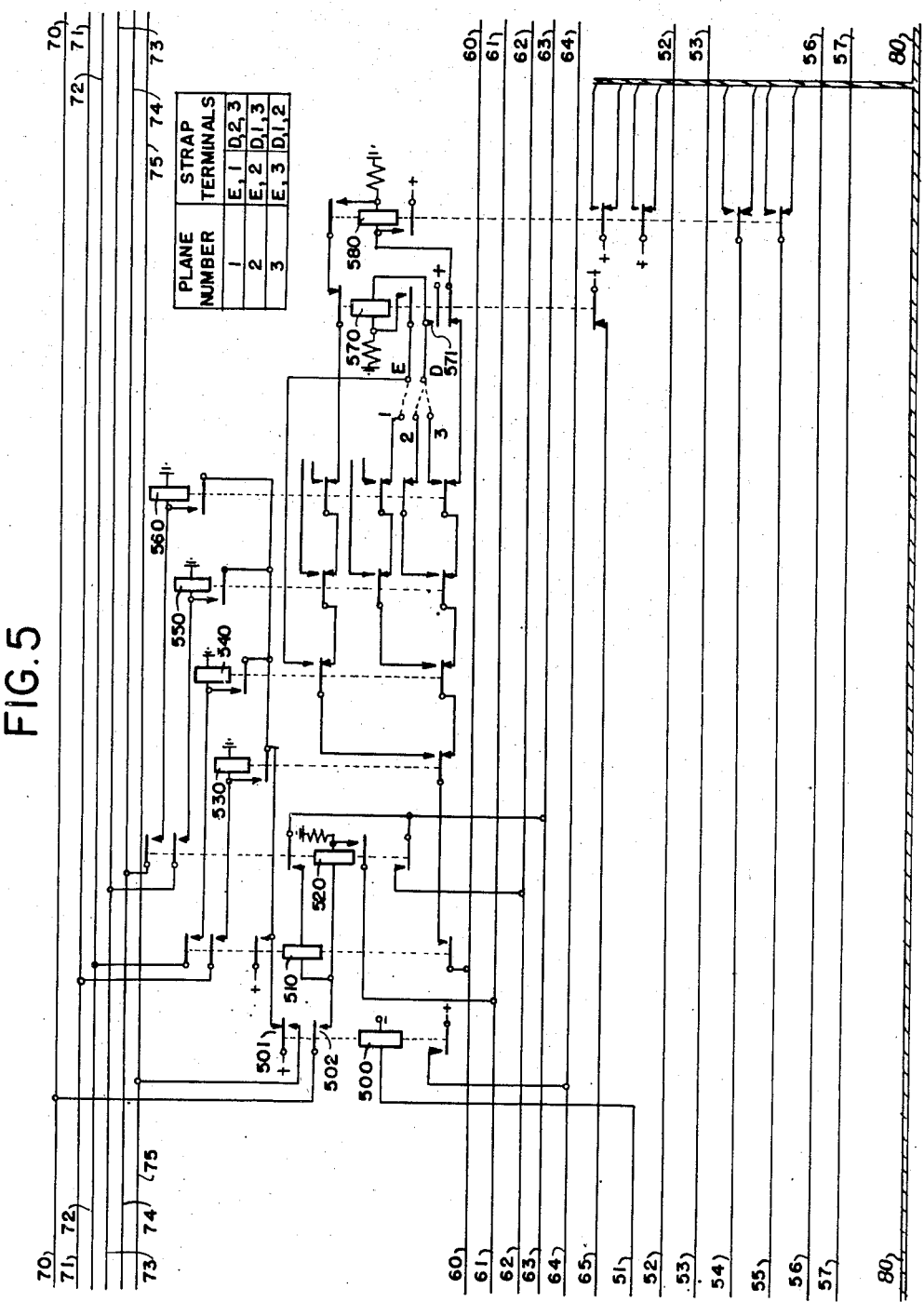

Figs. 4, 5 and 6, when placed side by side in the order named, comprise a schematic diagram of the switching equipment employed in one of controlled planes.

As previously mentioned, ten audio frequency tones, any one of which may be superimposed on a radio frequency carrier, are employed to control three airplanes simultaneously or selectively. Four of these tones are used for directing the controlled planes up, down, right, or left. Two more of the tones are used for increasing or decreasing any one of ten variable functions previously selected by the switching equipment as will presently be described. The remaining four tones are used for the control of the switching equipment constituting the invention. Of the latter four tones, one is used to control a group of distributor relays in the controlled plane, and each of the other three tones controls a group of register relays in conjunction with the distributor relays. Each control signal consists of a seizure pulse of one of these three tones followed by five pulses of the tone which controls the distributor relays. During none, or any one or two, of the four spaces between the five pulses the same tone used for seizure may be repeated. The distributor relays prepare a circuit to a different one of four relays in the register corresponding to the seizure tone during each of the four spaces between the five tone pulses. When the seizure tone is repeated during these spaces the corresponding relays in the register are operated. The various combinations which can be formed by operating none, or any one or two, of the four relays permits ten functions to be controlled by a register.

In the first register four of the ten possible functions are used for plane selection and two more are used for aileron control. The second register is used for controlling five apparatus units, each of which has two possible operated conditions. The ten possible combinations in the third register are used to prepare any two of twenty circuits associated with ten apparatus units. Either one of the two selected circuits may then be completed for as long an interval as desired by the increase or decrease tone to turn on or off, or to increase or decrease the degree of operation of, the selected one of the ten apparatus units.

The coded signals are produced in the control equipment by a relay type code sender and a group of ten code selecting relays. A group of control keys, or switches, is provided for each group of functions. Each key in a group corresponds to one of the code selecting relays so that the code transmitted depends upon which key in a group is operated. The same codes are used by all groups but the particular one of the three tones used for seizure and function selection depends upon the group in which a key is operated. This latter tone selection is accomplished by two relay groups, each of which is associated with one of the key groups. These latter relay groups also cause signals to be transmitted in sequence when keys in different groups are operated at nearly the same time, and also connect the code selecting relays to the key group in which a key has been operated in order to select the code to be transmitted.

The fuction of each unit will now be described with reference to the accompanying drawings. In Fig. 1 the ten keys C1 to C10 which control the ten variable functions are shown at the top of the drawing. These keys are of the mechanical interlocking type in which the operation of any key releases a previously operated key and latches itself operated. A set of common springs C11 are also provided and are arranged to be momentarily operated by the latching bar when any of the selecting keys is operated. The group of four keys A1 to A4 at the left center portion of the drawing is used for plane selection. These keys are also of the mechanical interlocking type and common springs A5 are also provided for this group. At the lower left there is shown the increase-decrease key 10 and the quadrant switch 20. The quadrant switch consists of a shaft that is flexibly mounted near one end so as to normally occupy a vertical position, but permitting its free end to be displaced forward, backward, or laterally in the same fashion as the control stick in an airplane. Four snap-action switches are positioned about the shaft at 90° intervals so as to permit selective operation of any one of the switches by movement of the free end of the shaft. The forward and backward motion of the quadrant switch operates the elevators of the controlled planes, while the lateral motion of the quadrant switch controls the rudders, either alone or in conjunction with the ailerons depending upon whether a switch 21 located within the shaft of the quadrant switch is operated or released. Two ordinary relays, 100 and 110, and two mechanically interlocked relays, 120 and 130, are controlled by switch 21 to accomplish this result in a manner to be described presently. Relays 140 to 160 are storage relays associated with the plane selection key group, and relays 170 to 190 are similar storage relays associated with the variable function selecting key group.

In Fig. 2 five single pole double throw toggle switches B1 to B5 are shown at the top of the drawing. Each toggle switch is associated with a pair of mechanically interlocked relays like 200B and 210B. Each of these mechanical interlocking relays is in turn associated with one of the ten code selecting relays 200 to 290 shown at the center of the drawing. Relay 200T shown at the left transfers the code selecting relays from the mechanically interlocked relays to contacts of the storage relays 160 and 190 of Fig. 1 when one of the mechanically interlocking push keys of Fig. 1 is operated. The three remaining relays 210S to 230S at the right of the drawing are start and lockout relays which start the code sender of Fig. 3 whenever one of the code selecting relays is operated and also prevent any new codes from being registered until a previously registered code has been transmitted.

The relays shown in Fig. 3 constituting the code sender consist of a pair of pulse generating relays 300 and 310, a pulse directing relay 320, and five counting relays 330 to 370. At the right of the drawing a radio transmitter and ten audio frequency oscillators are illustrated in block form. It should be noted that although ten separate oscillators have been illustrated for convenience, a single oscillator will suffice if it is arranged so that its frequency is controlled by the switching equipment. This is possible because only a single frequency is required at a time and can readily be accomplished by using a conventional vacuum tube oscillator in which the frequency is determined by resistance and capacitance, or inductance and capacitance elements, by providing ten sets of frequency determining elements and connecting the proper set in the oscillating circuit by keying relays controlled over the leads which are shown terminating in oscillators OSC. 1 to OSC. 10.

At the left side of Fig. 4 there is shown in block form the radio receiver carried by each of the controlled planes which demodulates the signals radiated by the transmitter of Fig. 3 and applies the resultant audio frequency signal to ten band pass filters, BPF. 1 to BPF. 10, each of which passes the frequency produced by its corresponding oscillator of Fig. 3. The output of each of these filters is used to control one of the keying relays K1 to K10. It may be well to mention at this point a further advantage in using only a single audio frequency at a time for signaling. In any amplifying system there is usually some unavoidable non-linearity present, such as the curvature of the plate characteristic of a thermionic tube, which results in cross modulation products of the signal frequencies and of their harmonics being present in the output of the system when more than one frequency is applied to the input. These cross modulation products might result in the production of a new frequency which is the same as one of the frequencies at times used for signaling. A false operation might be produced by these spurious frequencies. When a single frequency is used only harmonics of the single frequency will be produced by such non-linearity in the system. False operations due to these harmonic frequencies can be avoided by using signal frequencies that are not harmonically related.

At the right of Fig. 4 are shown five distributor relays 440 to 480, a pulse directing relay 430, pulsing relay 420, and holding relays 400 and 410.

This group of relays is common to the three registers shown in Figs. 5 and 6 and serves to successively prepare circuits to the relays in a register during the series of impulses constituting a signal.

Fig. 5 shows the register that is used for plane selection and aileron control. It consists of pulsing relay 500, seizure relays 510 and 520, register relays 530 to 560, lockout relay 570, and aileron control relay 580. The table above relays 570 and 580 shows the manner in which relay 570 is connected to the register relays in each of the three controlled planes. Relay 570 is shown connected by dotted lines as it would be connected in the first controlled plane.

The remaining two registers are shown in Fig. 6 and are similar to the first register shown in Fig. 5. The same last two digits have been used for the corresponding relays in each of the registers. The control circuits from the keying relays and from the register relays are extended to the various apparatus units by cable 80.

Returning now to Fig. 1, the transmission of a signal to effect a plane selection will be described in detail. As previously mentioned, plane selection is accomplished by the four key strip of interlocking push keys A1 to A4. Assuming that it is desired to control plane 1 individually, key A1 will be operated. The operation of key A1 releases any previously operated key, momentarily operates the common springs A5, and prepares a circuit to code selecting relay 220 from + battery at contacts of relay 230S over lead 30, through operated contacts A1 to contacts of relay 160. The momentary operation of the common springs A5 completes a circuit to relay 140 causing it to operate and lock itself by its own make contacts. Relay 140 completes a circuit to relay 150 from + battery at contacts 211S, through contacts 221S, over lead 31, through contacts 141 and 181. This latter circuit will be completed only if the code selecting relays are free. If there is a code transmission in progress relays 210S and 220S will be operated and hence the circuit to relay 150 will not be completed until the previously registered code has been sent. When relay 150 operates it closes its locking circuit to contacts of relay 140, closes a circuit to relay 160, prepares a circuit for shunting down relay 140 over lead 32, and closes a circuit to relay 200T over lead 33. Relay 160 operates, prepares its locking circuit to lead 34, and connects all of the plane selecting keys, A1 to A4, to contacts of relay 200T. Relay 200T operates; prepares its locking circuit to contacts of relay 230S; prepares a circuit to OSC. 2 from contacts of the code selecting relays over lead 45, through contacts of relay 200T to lead 35, over lead 35 to contacts of relay 160, and thence over lead 36 to OSC. 2; and completes the connections from the plane selecting keys A1 to A4, to code selecting relays 220 to 250, respectively. A circuit is thus completed to relay 220 from + battery over lead 30 through contacts of key A1, contacts of relay 160, lead 37, contacts of relay 200T, through the winding of relay 220, through the chain contacts of the succeeding code selecting relays 230 to 290 to lead 38, and over lead 38 to − battery, or ground, at contacts of relay 330.

The purpose of the chain contacts in the circuit last traced is to prevent more than one code selecting relay from being operated at the same time. In the present case this serves as a precaution to prevent a false code from being transmitted if two of the interlocking push keys were operated at the same time by mistake. However, as will be later described, it is intended that several of the toggle switches, B1 to B5, may be operated at the same time and in that case the chain circuit causes the codes corresponding to each toggle switch operation to be sent in sequence.

Relay 220 operates over the previously traced circuit, prepares its locking circuit through relay 210S, closes a circuit to relay 230S, and connects lead 45 to lead 42 so as to operate OSC. 1 during the second spacing interval. Relay 230S operates, removes + battery from lead 30 thus opening the operating circuit to relay 220 and removing a short circuit from relay 210S, and completes the locking circuit for relay 200T. Relay 210S operates in series with relay 220 from − battery over lead 38, closes a circuit to relay 220S, closes a locking circuit to relay 160 over lead 34, removes + battery from lead 31 to guard the code selecting relays, and short-circuits relay 140 over lead 32. Relay 140 restores and opens the locking circuit to relay 150. Relay 150 restores and opens the operating circuits to relays 160 and 200T.

When relay 210S operated it also completed a circuit to OSC. 2 from ground at contacts 311 through contacts 371, over lead 39, through contacts 212S and thence over the previously traced circuit including leads 45, 35, and 36 to the oscillator. The operation of OSC. 2 modulates the radio frequency carrier produced by the transmitter at a particular audio frequency. The carrier is demodulated by the radio receiver in Fig. 4 and the audio frequency signal causes the operation of relay K2. Relay K2 closes a circuit to relay 500 over lead 51. Relay 500 operates, closes a circuit to relay 410 over lead 64, opens the locking circuit to relays 530 to 560 to release any of them which were previously operated, and closes a circuit to relay 520 from + battery at contacts 501, over lead 75, through the chain contacts of the distributor relays, over lead 70, and through contacts 502. Relay 520 operates, prepares circuits to register relays 550 and 560 from leads 73 and 74, prepares its holding circuit over lead 63 in series with relay 510, and prepares a circuit for extending + battery to the distributor relays over lead 62 from lead 63. Relay 410 operates and connects + battery to lead 63.

The above operations complete the registration of the code to be transmitted and the seizure of a register in the controlled plane. The code transmission is started by the operation of relay 220S which extends + battery over lead 46 to the code sender. A circuit is closed to relay 310 from + battery on lead 46 causing it to operate and close a circuit to relay 300. Relay 300 operates and opens the circuit to relay 310. Relay 310 restores and opens the circuit to relay 300 which restores and recloses the circuit to relay 310. This cycle of operations is repeated five times for each transmission of a signal as determined by counting relays 330 to 370. The speed and the per cent closure time of the contacts of relay 310 is governed by the operate and release times of relays 300 and 310. Relay 310 is made slow-to-release by a copper sleeve on its core. Relay 300 is made slow-to-release by an adjustable shunting resistor. Relay 300 is also preferably made slightly slow to operate by using a relatively large number of turns in its winding in order to secure the optimum per cent closure time of the contacts of relay 310. During the first operation of relay 310, contacts 311 transfer ground from OSC. 2 to OSC. 1, and contacts 312 close a circuit to relay 370. Relay 370 operates, closes its locking circuit to lead 46, prepares circuits to relays 320 and 360 at contacts 372 and 373, and prepares a circuit for connecting ground to lead 41 through contacts 311 during the first restoration of relay 310. The first restoration of relay 310 grounds lead 41, closes a circuit to relay 320 through contacts 372, and opens the operating circuit to relay 370. Relay 320 operates, closes its locking circuit through contacts 372, and prepares a circuit to relay 360 through contacts 373. The second operation of relay 310 completes a circuit to relay 360 at contacts 312, transfers ground from lead 41 to OSC. 1, and closes a further circuit to relay 320. Relay 360 operates, closes its locking circuit, prepares a circuit to relay 350, opens the operating circuit to relay 320, and prepares a circuit to ground lead 42 curing the second restoration of relay 310. When relay 310 restores the second time it opens the locking circuit to relay 320, opens the operating circuit to relay 360, and grounds lead 42 which causes the operation of OSC. 2 since lead 42 is connected to lead 45 by code selecting relay 220. Subsequent operations and restorations of relay 310 cause the successive operations of counting relays 350, 340, and 330 in conjunction with the operation of relay 320. OSC. 1 is operated during each operation of relay 310 and leads 43 and 44 are grounded during the successive restorations of relay 310. When relay 330 operates upon the fifth operation of relay 310 it removes— battery from lead 38 to release relays 220 and 210S, opens the locking circuit to counting relays 340 to 370, closes its own locking circuit, and connects + battery from operated contacts on relay 310 to lead 46 to hold relay 220S when relay 210S restores. Relays 340 to 370 restore. Relay 220 restores and opens the circuit to relay 230S. Relay 210S restores, opens the operating circuit to relay 220S, and opens the locking circuit to relay 160. Relay 160 restores. Relay 310 restores, opens the circuit to relay 300, and opens the locking circuits to relays 220S and 330. Relay 330 restores. Relay 220S restores after its slow release period and connects + battery to lead 31 to enable a new registration to be made.

The operation of the receiving equipment in response to the reception of the signal will now be described. It will be recalled that relays K2, 500, 520, and 410 were operated during the first operation of OSC. 2 constituting the seizure pulse. The operation of the code sender interrupted the operation of OSC. 2 and caused five successive operations of OSC. 1. OSC. 2 was reoperated during the second spacing interval between the five pulses. The interruption of OSC. 2 brings about the release of relay K2 which opens the circuit to relay 500. Relay 500 restores, opens the circuit to relay 410 over lead 64, and opens the operating circuit to relay 520 over leads 75 and 70 thus removing a short circuit from relay 510. Relay 510 operates, prepares circuits to relays 530 and 540, and prepares the locking circuits to the register relays 530 to 560. The operation of OSC. 1 immediately after the interruption of OSC. 2 causes the operation of relay K1 which closes a circuit to relay 420. Relay 420 operates and closes a circuit to relays 400 and 480 in multiple. Relay 400 operates and recloses the circuit to relay 410 which was opened by the release of relay 500. Relays 400 and 410 are both made slow-to-release by means of copper sleeves over their cores so that they will remain operated during the series of impulses of relay 420 which are produced by the five operations of OSC. 1. Relay 480 operates, closes its locking circuit to lead 62, prepares a circuit to register relay 530 over lead 71, and prepares circuits to relays 470 and 430. The first time that relay 420 restores it connects lead 75 to lead 71 at contacts 421 but since relay 500 is not operated during the first spacing interval lead 75 is open at contacts 501 and consequently register relay 530 remains normal. The first restoration of relay 420 also opens the operating circuits to relays 400 and 480, and closes a circuit to relay 430. Relay 430 operates, opens the holding circuit to relay 400 which extends from lead 62 through the locking contacts of relay 480 and contacts of relay 430, and prepares a circuit to relay 470. The succeeding operations of relay 420 and the distributor relays are similar to those previously described for the counting relays of the code sender in Fig. 5. One of the distributor relays 440 to 480 is operated for each operation of OSC. 1 and during the four spacing intervals lead 75 is successively connected to leads 71, 72, 73, and 74 preparing circuits to register relays 530, 540, 550, and 560, respectively. In this case OSC. 2 was operated only during the second spacing interval, causing the operation of relays K2 and 500 during this interval to complete a circuit to register relay 540 from contacts 501, over lead 75, through contacts 421 and the chain contacts of the distributor relays to lead 72, and through contacts of relay 510. Relay 540 operates, closes its locking circuit to contacts of relay 510, and prepares a circuit to terminal 1. The operation of distributor relay 440 during the fifth operation of relay 420 completes a circuit over lead 60, through contacts of relay 510, and through the chain contacts of the register relays to terminal 1. The operation of relay 570 in each controlled plane depends upon the strapping between terminals 1, 2, 3, and E, D. In plane 1 terminal 1 will be connected to terminal E, as indicated, causing no effect if relay 570 is already restored. However, if relay 570 had previously been operated it would be locked through its own contacts 571. In this event relay 570 will be short-circuited by the + battery on terminal 1 causing it to release. In both planes 2 and 3 terminal 1 will be connected to terminal D which will cause relay 570 in those planes to be operated by the + battery on terminal 1. Relays 570 in planes 2 and 3 operate, close their locking circuits at contacts 571, open the operating and releasing circuits to relays 580, and remove + battery from lead 65 to prevent subsequent operations of keying relays K3 to K10 from having any effect. Until relays 570 in planes 2 and 3 are released by a subsequent operation of the appropriate plane selecting key the switching equipment controls the operation of plane 1 alone. The restoration of relay 420 after the fifth operation of OSC. 1 connects + battery to lead 61 through contacts of relay 440 to short-circuit relays 510 and 520. Relays 510 and 520 release and disconnect leads 62 and 63 to release the distributor relays 440 to 480. Relays 400, 410, and the distributor relays 400 to 480 restore.

If plane selecting key A2 is operated a similar cycle of operations occurs except that code selecting relay 230 will be operated instead of relay 220 causing OSC. 2 to be operated during the third spacing interval instead of the second. Register relay 550 will then become operated instead of relay 540 causing terminal 2 to be connected to + battery during the fifth operation of relay 420. Relay 570 in plane 2 will therefore be short-circuited causing it to release, relay 570 in plane 1 will be operated, and relay 570 in plane 3 will remain operated. The contacts of keying relays K3 to K10 will therefore be effective only in plane 2.

Similarly, the operation of plane selecting key A3 disables the contacts of keying relays K3 to K10 in planes 1 and 2 and enables the corresponding contacts in plane 3.

Plane selecting key A4 is operated when it is desired to control all three planes simultaneously. The operations are again similar to those previously described, in this case code selecting relay 250 is operated to cause OSC. 2 to be operated during both the first and second spacing intervals. Register relays 530 and 540 are thus operated causing + battery to be connected to terminal E in all three planes during the fifth operation of relay 420. Relay 570 is short-circuited in each plane in which it is operated to enable the keying relay contacts in all planes. Four codes are thus used to select any one of the three planes or to select all three planes. Two more codes are used to control relay 580 as will be described. Since ten codes are available the unused contacts on the register relays could be connected to additional terminals like 1, 2 and 3 and additional keys could be added to the four key strip of keys A1 to A4 to permit more than three planes to be controlled by the same equipment. In the present disclosure the equipment is arranged to control a different function by means of the same register used for plane selection to economize on the number of relays which must be carried by each controlled plane. This additional function consists in the control of relay 580 in the selected plane, or planes, in accordance with the operation of switch 21 in the control plane.

When the quadrant switch 20 is moved forward or backward either OSC.9 or 10 is operated over leads 48 or 47 to cause the operation of the corresponding keying relay, K9 or K10, in the controlled plane. Contacts on K9 or K10 operate electric motors, or other suitable means, to move the elevators in the selected plane in accordance with the operation of the quadrant switch. In a similar manner lateral movement of the quadrant switch operates OSC. 5 or OSC. 6 over leads 50 or 49 to cause the operation of the corresponding keying relays, K5 or K6, in the selected plane. Contacts of K5 and K6 are connected through leads 54 and 55 to armature springs of relay 580. When relay 580 is restored leads 54 and 55 are connected to auxiliary equipment which is not shown so as to control the operation of the rudder and ailerons, but when relay 580 is operated leads 54 and 55 are connected to the auxiliary equipment so as to control the rudder alone. Normally relay 580 is restored and the combined operation of the rudder and ailerons causes the plane to bank when a turn is executed. In landing operations, switch 21 is operated to operate relay 580 so that banking will not occur when the quadrant switch is moved laterally. The transmission of a signal to effect the operation or release of relay 580 is similar to the transmission of a plane selection signal except for the manner of registering the code in response to the operation or release of switch 21. When switch 21 is operated it locks mechanically and closes a circuit to the upper winding of relay 100. Relay 100 operates, closes a circuit to relay 110, closes a circuit to relay 140 from + battery at contacts 161 through contacts 101 and contacts of relay 120, and prepares a circuit for operating code selecting relay 200 from + battery over lead 66 and through contacts of relay 120. Relay 110 operates, prepares its locking circuit, and disconnects leads 49 and 50 from the quadrant switch to prevent any operation of the rudder in the controlled plane while the signal is being transmitted. Relay 140 operates and closes a circuit to relay 150 from + battery on lead 31 if or when the code selecting relays are free. The succeeding operations of relays 150, 160, code selecting relay 200, etc. are the same as previously described. In addition to the operations described previously the operation of relay 180 opens the operating circuit to relay 140 and closes the locking circuit to relay 110 at contacts 161. The operation of relay 210S and subsequent release of relays 140 and 150 closes a circuit to relay 130 and to the lower winding of relay 100 from + battery over lead 32, through contacts of relay 150 to lead 67, through contacts of relay 200 to lead 68, and through contacts of relays 160 and 100. The above circuit to the lower winding of relay 100 is to prevent relay 100 from being released by the opening of switch 21 during the signal transmission. Relay 130 operates and mechanically releases relay 120. Relay 120 restores, mechanically locks relay 130 operated, and opens the operating circuit to relay 110. When the code signal has been sent as described for the plane selecting operation relays 200 and 210S are released by the operation of relay 330 thus removing + battery from lead 68. Relay 100 remains operated as long as the circuit to its upper winding is maintained by switch 21. Relay 130 is deenergized but is mechanically locked in the operated position by relay 120. The release of relay 210S also removes + battery from lead 34 which releases relay 160. Relay 160 restores and unlocks relay 110 at contacts 161. Relay 110 restores and connects leads 49 and 50 to the quadrant switch. Since none of the leads 41 to 44 are connected to lead 45 by code selecting relay 200 the code transmitted consists of one operation of OSC. 2 followed by five operations of OSC. 1. Consequently none of the register relays 530 to 560 will be operated when relay 420 is operated the fifth time. A circuit is therefore closed from + battery over lead 60, through contacts of relay 510, the chain contacts of the register relays, and contacts of relay 571 to relay 580. Relay 580 operates, locks itself operated, and transfers leads 54 and 55 so as to enable them to control the rudder alone. Additional contacts on relay 580 transfer + battery from one set of leads to another. These latter leads are used in conjunction with the circuits extended from leads 54 and 55 to effect the desired transfer of control by the auxiliary equipment not shown. It should be noted that relay 580 will be operated only if relay 570 is restored. If plane 1 had previously been selected, for example, relay 580 would be operated only in plane 1 because relay 570 would have been operated in planes 2 and 3 by the previous plane selecting operation.

When it is desired to return to combined control of rudder and ailerons by the quadrant switch so as to execute banked turns, switch 21 is mechanically released to open the circuit to the upper winding of relay 100. Relay 100 restores, closes a circuit to relay 110, closes a circuit to relay 140 from + battery at contacts 161, through contacts 101 and contacts of relay 130, prepares a circuit to operate relay 120 from lead 68, and prepares a circuit to operate code selecting relay 210 from lead 66. Relays 110, 140, etc. operate as before. This time when + battery is connected to lead 68 a circuit is closed to relay 120 through back contacts of relay 100 and operated contacts of relay 130. Relay 120 operates, opens the operating circuit to relay 110, and mechanically releases relay 130. Relay 130 restores, mechanically locks relay 120 operated, and opens the operating circuit to relay 120. Relay 110 is released when relay 160 restores at the end of the transmission and it reconnects leads 49 and 50 to the quadrant switch. As code selecting relay 210 connects lead 41 to lead 45 the transmitted code signal will consist of one operation of OSC. 2 followed by five operations of OSC. 1 with OSC. 2 reoperated during the first spacing interval. Register relay 530 will thus become operated causing the fifth operation of relay 420 to short-circuit relay 580 from + battery over lead 60, through contacts of relay 510, the chain contacts of register relays 530 to 560, and contacts of relay 570. Relay 580 restores and returns leads 54 and 55 to the joint control of rudder and ailerons. It will again be noted that relay 580 will be affected only in the selected plane, or planes, in which relay 570 is restored.

The operation of the variable function selecting operations by keys C1 to C10 is very similar to the plane selecting operations by keys A1 to A4. A separate start signal register is used comprising relays 170 to 190, each of which controls circuits corresponding to those controlled by the start signal register relays 140 to 160, respectively, associated with the plane selecting keys. Relay 170 is operated by the momentary operation of the common springs C11 whenever one of the keys C1 to C10 is operated to the latching position. Relay 180 is then operated over lead 31 when the code selecting relays are free. However if relay 140 is operated, indicating that a key in the plane selecting group has been operated and the corresponding code signal has not yet been transmitted, contacts 141 of relay 140 prepare a circuit to relay 150 and prevent the operation of relay 180 until this plane selecting code has been registered and transmitted. The plane selecting keys are thus given preference because in using the control equipment the function selecting key may oftentimes be operated immediately after the operation of the plane selecting key corresponding to the plane in which the function is to be performed. When relay 180 does operate it closes a circuit to relay 190 which operates and connects all of the keys C1 to C10 to the corresponding code selecting relays. 200 to 290, through contacts of relay 200T, which is also operated by relay 180 over lead 33. The registration and transmission of the code signals is the same as described for plane selection except that a greater number of codes are used and also that OSC. 4 takes the place of OSC. 2. This selection is accomplished by the operation of relay 190 in place of relay 160, thus connecting lead 35 to lead 69 in place of lead 36. Therefore, the first pulse of ground over lead 35 causes the operation of OSC. 4 which causes the operation of keying relay K4 in the controlled planes. Contacts of relay K4 are connected over lead 53 to the pulsing relay 700 of the third register. The register relays 730 to 760 are successively connected to contacts of relay 700 during the corresponding four spacing intervals by the distributor relays via leads 71 to 75. At the conclusion of a code signal the register relays will be operated in accordance with the operations of relay 700 during the spacing intervals, which operations are controlled by the connections of leads 41 to 44 to lead 45 by the code selecting relays. The complete code used is tabulated below, the crosses indicating the spacing intervals during which OSC. 4 is operated.

| Selected Function | Spacing Interval | | | |
|---|---|---|---|---|
| | 1 | 2 | 3 | 4 |
| 1 | -- | -- | -- | -- |
| 2 | X | -- | -- | -- |
| 3 | -- | X | -- | -- |
| 4 | -- | -- | X | -- |
| 5 | -- | -- | -- | X |
| 6 | X | X | -- | -- |
| 7 | X | -- | X | -- |
| 8 | X | -- | -- | X |
| 9 | -- | X | X | -- |
| 10 | -- | X | -- | X |

The above code is the same as that used for plane selection and aileron control except that OSC. 2 was used then instead of OSC. 4. The chain contacts of register relays 730 to 760 are divided into two groups, each of which selects one of ten circuits corresponding to the key C1 to C10 operated at the control station. Either of the two selected circuits can then be completed over leads 56 or 57 by the operation of keying relays K7 to K8. Either of these latter relays may be operated by throwing key 10 to the right or left to operate OSC. 7 or 8 over leads 76 or 77. As either selected circuit may be completed for as long an interval as desired they are suitable for the control of variable functions such as the engine throttle. This may readily be accomplished by providing reversible electric motors for varying the selected functions and connecting the motors to the leads extending from register relays 730 to 760 so that the selected motor will run in one direction when keying relay K7 is operated and so that the motor will run in the opposite direction when keying relay K8 is operated. Relay 720 is arranged to open leads 56 and 57 while a signal is being received to prevent a false operation in case keying relays K7 or K8 are operated at that time. Unless this is done a momentary circuit would be completed to an undesired lead if the received code requires the operation of two register relays because the two register relays would be operated at different times. The functions controlled by this register are not necessarily variable. Auxiliary relays, arranged to be controlled over the leads extending from the register relays, may be provided so that a selected apparatus unit can be operated by connecting + battery to lead 56 and can be released by connecting + battery to lead 57.

The transmission of code signals in response to the operation of one or more of the toggle switches B1 to B5 is considerably different than that heretofore described as regards the registration upon the code selecting relays. For one thing, it is intended that a number of these switches may be operated simultaneously or in rapid succession and that the corresponding codes shall then be transmitted in succession. It is also intended that these switches may be operated while the transmission of a code due to the operation of a key in one of the other groups is in progress. Assuming that switch B1 is thrown to the right, a circuit is closed from + battery over lead 31, through chain contacts on relays 140 and 170, over lead 78, through switch B1, contacts of relay 200B, and contacts of relay 200T to code selecting relay 210. If the code selecting relays are in use this circuit will be open at contacts 211S and 221S. If one of the keys in the other groups has been operated and has not yet been registered the circuit will also be open at contacts of relay 140 or 170. In the latter case the circuit will not be completed until the code selecting relays become free, the code corresponding to the operated key in the other key groups has been registered and transmitted, and the code selecting relays again become free. When the circuit is completed, relay 210 operates, prepares its locking circuit through relay 210S, closes a circuit to relay 230S, and closes a circuit to relay 210B in multiple with itself. Relays 230S operates. Relay 210B operates and mechanically releases relay 200B. Relay 200B restores and opens the operating circuit to relay 210 which also removes a short circuit from relay 210S. Relay 210S operates, closes a circuit to relay 220S and removes + battery from lead 31 to guard the code selecting relays and also opening the circuit to relay 210B. The code signal is transmitted as previously described except that OSC. 3 takes the place of OSC. 2. This occurs because lead 45 is connected through back contacts of relay 200T to lead 79 and relay 200T is not operated at this time. The transmitted code thus consists of one operation of OSC. 3 followed by five operations of OSC. 1 and a second operation of OSC. 3 during the first spacing interval. The corresponding operations of keying relays K1 and K3 in the controlled plane, or planes, effects the seizure of the second register by the operation of relay 600 over lead 52 when relay K3 is operated and causes register relay 630 to be operated during and after the signal transmission. During the fifth operation of relay 420 a circuit is closed from + battery over lead 60, through contacts of relay 610, and through the chain contacts of the register relays 630 to 660 to the selected one of the ten leads which control the operation of auxiliary relays (not shown) to operate the corresponding apparatus unit. Auxiliary relays are used to effect a continued operation of the apparatus unit because only a momentary circuit is closed through the chain contacts of the register relays. Each auxiliary relay is preferably connected to two of the ten leads in a manner similar to the connection of relay 580 to two of the ten leads from register 1 so that closing a momentary circuit to one of these two leads will operate the auxiliary relay and closing a momentary circuit to the other of two leads will release the auxiliary relay. Contacts on the auxiliary relay may then be used to control an apparatus unit in accordance with the position of the corresponding switch, B1 to B5, at the control station. When switch B1 is returned to the left it closes a circuit to code selecting relay 200 from lead 78, through switch B1, and contacts of relay 200B after any previously stored signals have been transmitted. Relay 200 operates, prepares its locking circuit through relay 210S, closes a circuit to relay 230S, and closes a circuit to relay 200B in multiple with itself. Relay 230S operates. Relay 200B operates, mechanically releases relay 210B, and opens the operating circuit to relay 200 which also removes a short circuit from relay 210S. Relay 210B restores and mechanically locks relay 220B operated. Relay 210S operates and removes + battery from lead 78 by opening lead 31 at contacts 211S. The succeeding operations will not be described as they should be apparent from the preceding description.

If all of the switches, B1 to B5, were operated to the right simultaneously, a circuit would be completed to relays 210, 230, 250, 270, and 290 in multiple. All of these relays would attempt to operate but the operation of any one of them opens the circuit to all of the preceding code selecing relays by means of the chain circuit connected to lead 38. Consequently, only the highest numbered code selecting relay will remain operated, in this case relay 290. The operation of relay 290 causes the operation of relay 290B, which mechanically releases relay 280B and this in turn removes the short circuit from relay 210S which removes + battery from lead 31 to guard the code selecting relays and starts the code transmission. After this first code has been sent relay 210S is released and + battery is again connected to lead 31. If none of the push keys C1 to C19 or A1 to A4 have been operated in the meantime this + battery is extended to lead 78 causing code selecting relays 210, 230, 250, and 270 to again attempt to operate. This time relay 270 is the only relay which can remain operated. This cycle of operations is continued until the five codes corresponding to the operation of switches B1 to B5 to the right have been transmitted in succession. If any of the push keys is operated during the transmission of these five codes relay 140 or 170 will be operated and will extend lead 31 to relay 150 or 180 instead of to lead 78 thus causing the code corresponding to the operated push key to be registered and transmitted as soon as the code transmission in progress is completed. The transmission of the remaining codes corresponding to the operations of switches B1 to B5 will then be resumed where it was left off. Of course, some of the switches B1 to B5 may be operated to the left at the same time that others are operated to the right, the description being limited to operations in one direction merely for simplicity.

The function of relays 400 and 410 in Fig. 4 was not mentioned previously because during normal operation they have no useful function. Relays 400 and 410 could be omitted and + battery permanently connected to lead 63. The difficulty that may arise if this is done is that if keying relay K1 is not operated five times during the reception of a signal, due to static or some other temporary radio failure, the fifth distributor relay 440 will not be operated and consequently the register relays will remain connected to the distributor. The next succeeding signal will advance the distributor relays the number of steps that were missed and will then release the register relays. If the register is re-seized by a pulse of tone from OSC. 2 to 4 during one of the succeeding spacing intervals in the same signal the distributor relays will start again and will advance during the remainder of the signal. The distributor will thus remain out of step until a signal is received which has no tone pulses during the spacing intervals. The addition of relays 400 and 410 insures that the distributor relays will be restored and released from the register at the end of each transmission even when the signal is incomplete. This is accomplished by obtaining the operating and holding + battery for the distributor relays from make contacts of relay 410 over leads 63 and 62. Relay 410 is operated when the register is seized and is held by relay 400 during impulsing of relay 420. At the end of a signal relays 400 and 410 release after their slow-to-release periods and release the distributor relays and the register seizure relays, corresponding to relays 510 and 520, if any of these relays remain operated due to an incomplete or otherwise distorted signal.

Although the invention has been illustrated as applied to remote control over a radio link it is also applicable to systems operated over wire lines. In a wire system the leads which terminate in oscillators OSC. 1 to OSC. 10 would be extended to the remote stations where they would control the corresponding keying relays K1 to K10. In the appended claims the term signaling channel is intended to include such a direct wire connection.

Having described and illustrated the invention, what is considered new and is desired to secure by Letters Patent is pointed out in the subjoined claims.

What is claimed is:

1. In a selective signaling system; a sending station and a plurality of receiving stations; a signaling channel common to all of said stations; a plurality of circuits at each receiving station; means at the sending station for transmitting station selecting or circuit selecting codes of impulses over said signaling channel, each of said codes comprising a fixed series of current impulses of one frequency and one or more current impulses of any one of a plurality of other frequencies in the spaces between successive impulses of said series; selecting means at each receiving station controlled by said codes of impulses; and lockout means operated by the selecting means at each receiving station in response to a station selecting code for enabling the selection of circuits at one station, and for disabling the selection of circuits at the other stations by the selecting means in response to any circuit selecting codes received thereafter; said lockout means remaining in their respective last operated positions at each receiving station until reset by the receipt of a different station selecting code.

2. In a remote control system; a first and a second station, a plurality of groups of circuits at the second station; means for transmitting a series of impulses of one type and one or more impulses of another type interspersed between the impulses of the series, means at the second station for selecting any one of said circuits comprising distributing means arranged to be advanced over a plurality of selecting positions in synchronism only with said series of impulses transmitted by the first station and a plurality of groups of relays, a relay in each group corresponding to each of said selecting positions and each group of relays being associated with one of said groups of circuits, means for connecting any one of said groups of relays with the distributing means, and for operating the relays of such connected group in different combinations in response to said other impulses which are chronologically related to the impulses of said series, each of said combinations being effective to select a different one of the circuits in the associated group.

3. In a remote control system, a first and a second station, a signaling channel therebetween, a plurality of circuits at the second station, means at the first station for transmitting a series of audio frequency impulses over said signaling channel and for transmitting other impulses at any one of a plurality of other audio frequencies in one or more of the interstices of said series; and means at the second station jointly controlled by said series of impulses and said other impulses for selecting any one of said circuits as determined by the number and frequency of said impulses.

4. In a selective signaling system; a plurality of remote stations, a control station, means at the control station for transmitting a series of impulses of current of a particular frequency to all the remote stations, a distributor at each remote station operated in response to said series of impulses, a series of relays at each remote station each rendered operative in a particular position of the distributor at that station, means at the control station for interspersing either one or more impulses of either of a plurality of other frequencies of current between the impulses of said series and means in each station operative only when the interspersed impulses are of a particular frequency to render the relays of that station operative, and means at each remote station operative by the said interspersed impulses to operate a particular relay at that station dependent on the number of interspersed impulses received, when the relays at that station have been rendered operative.

5. In a selective signaling system; a plurality of remote stations, a control station, means at the control station for transmitting a series of impulses of current of a particular frequency to all the remote stations, a distributor at each remote station operated in response to said series of impulses, a series of relays at each remote station each rendered operative in a particular position of the distributor at that station, means at the control station for interspersing either one or more impulses of either of a plurality of other frequencies of current between the impulses of said series at different interstices of said series of impulses, and means in each station operative only when the interspersed impulses are of a particular frequency to render the relays of that station operative, and means at each remote station operative by the said interspersed impulses to operate a particular relay at that station dependent on the number of interspersed impulses received and on the position of the interspersed impulses relative to said series of impulses, when the relays at that station have been rendered operative.

6. In a signaling system, a plurality of remote stations, a control station, means at said control station for transmitting a series of impulses of current of a particular frequency to all said remote stations, a distributor at each remote station operated in response to said series of impulses, a plurality of groups of relays at each remote station, each group corresponding to one of a plurality of other frequencies, means at said remote stations for preparing a relay in each group for operation in each position of each said distributor, means at said control station for interspersing in the interstices of said series of impulses one or more impulses of current of any one of said plurality of other frequencies to operate the particular relays in said remote stations corresponding to the position of said distributor in each remote station and to the frequency of one or more interspersed impulses.

7. In a signaling system, a plurality of remote stations, a control station, means at said control station for transmitting a series of impulses of current of a particular frequency to all said remote stations, a distributor at each remote station operated in response to said series of impulses, a plurality of groups of relays at each remote station, each group corresponding to one of a plurality of other frequencies, means at said remote stations for preparing a relay in each group for operation in each position of each said distributor, means at said control station for interspersing in the interstices of said series of impulses one or more impulses of current of anyone of said plurality of other frequencies to operate the particular relays in said remote stations corresponding to the position of said distributor in each remote station, the frequency of said one or more interspersed impulses, and the location of the interstices of said series of impulses in which said interspersed impulses appear.

8. In a signaling system, a plurality of remote stations, a control station, means at said control station for transmitting a series of impulses of current of a particular frequency to all of said remote stations, a distributor at each remote station operated in response to said series of impulses, a plurality of groups of relays at each remote station, each group corresponding to one of a plurality of other frequencies, means at said remote stations for preparing a relay in each group for operation in each position of each said distributor, means at said control station for interspersing in anyone of the interstices of said series of impulses an impulse of current of anyone of said plurality of frequencies to operate the particular relay in said remote stations corresponding to the position of said distributor in each remote station and the frequency of the interspersed impulse.

9. In a signaling system, a plurality of remote stations, a control station, means at said control station for transmitting a series of impulses of current of a particular frequency to all of said remote stations, a distributor at each remote station operated in response to said series of impulses, a plurality of groups of relays at each remote station, each group corresponding to one of a plurality of other frequencies, means at said remote stations for preparing a relay in each group for operation in each position of each said distributor, means at said control station for interspersing in anyone or all of the interstices of said series of impulses an impulse of current of anyone of said plurality of other frequencies to operate the particular relay in said remote stations corresponding to the position of said distributor in each remote station, the frequency of the interspersed impulse and the location of the interstices of said series of impulses in which said interspersed one or more impulses appear.

10. In a signaling system, a plurality of remote stations, a control station, means at said control station for transmitting a series of impulses of current of a particular frequency to all of said current of a particular frequency to all of said remote stations, a distributor at each remote station operated in response to said series of impulses, a plurality of groups of relays at each remote station, each group corresponding to one of a plurality of other frequencies, means at said remote stations for preparing a relay in each group for operation in each position of each said distributor, means at said control station for interspersing in anyone of the interstices of said series of impulses an impulse of current of anyone of said plurality of frequencies to operate the particular relay in said remote stations corresponding to the position of said distributor in each remote station, the frequency of the interspersed impulse and the location of the interstice of said series of impulses in which said interspersed impulse appears.

11. In a selective signalling system as in claim 1, means for unlocking said locknut frame from its preventive position at each such other station in response to a particular one of said station selecting codes, for enabling the simultaneous selection of circuits at all of said stations in response to subsequent circuit selecting codes.

HARRY G. EVERS.

REFERENCES CITED

The following references are of record in the file of this patent:

UNITED STATES PATENTS

| Number | Name | Date |
|---|---|---|
| 1,882,010 | Hershey | Oct. 11, 1932 |
| 1,888,985 | Hershey | Nov. 29, 1932 |
| 1,930,525 | Levy | Oct. 17, 1933 |
| 1,945,470 | Steeneck | Jan. 30, 1934 |
| 2,082,550 | Powell | June 1, 1937 |
| 2,107,902 | Oliver | Feb. 8, 1938 |
| 2,113,368 | Blodgett | Apr. 15, 1938 |
| 2,141,551 | Phinney | Dec. 27, 1938 |
| 2,170,141 | Hailes | Aug. 22, 1939 |
| 2,276,646 | Boswau | Mar. 17, 1942 |
| 2,325,829 | Boswau | Aug. 3, 1943 |
| 2,339,872 | Miller | Jan. 25, 1944 |
| 2,394,080 | Laurensen | Feb. 5, 1946 |